United States Patent
Radloff

(10) Patent No.: US 6,252,766 B1
(45) Date of Patent: Jun. 26, 2001

(54) COMPUTER WITH PERIPHERAL DEVICE MOUNTING ASSEMBLY

(75) Inventor: Timothy Radloff, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/295,656

(22) Filed: Apr. 21, 1999

(51) Int. Cl.[7] .................................................. G06F 1/16
(52) U.S. Cl. ...................... 361/683; 361/679; 361/684; 361/685; 361/724; 361/425
(58) Field of Search .................................. 361/679, 683, 361/684, 685, 724, 727

(56) References Cited

U.S. PATENT DOCUMENTS

| | | |
|---|---|---|
| 5,233,594 | 8/1993 | Wilhelm . |
| 5,349,483 | 9/1994 | Tsai . |
| 5,355,267 | 10/1994 | Aoyagi et al. . |
| 5,485,348 | 1/1996 | Oros . |
| 5,488,538 | 1/1996 | Wakita . |
| 5,564,804 * | 10/1996 | Gonzalez et al. .................. 312/223.2 |
| 5,566,383 | 10/1996 | Gildea et al. . |
| 5,654,874 | 8/1997 | Suzuki . |
| 5,680,293 | 10/1997 | McAnnally et al. . |
| 5,788,211 * | 8/1998 | Astier ................................... 248/674 |
| 5,995,364 * | 11/1999 | McAnally et al. .................... 361/685 |

* cited by examiner

*Primary Examiner*—Leo P. Picard
*Assistant Examiner*—Yean-Hsi Chang
(74) *Attorney, Agent, or Firm*—Haynes and Boone, L.L.P.

(57) ABSTRACT

A computer, including an carrier for mounting a peripheral device in the chassis of the computer. The carrier includes a plate disposed in the chassis and having two or more extensions. The peripheral device is mounted on the plate between the extensions and is captured between the extensions to prevent relative movement between the device and the plate in a first plane. A hook member extends from the plate and engages the peripheral device to prevent movement of the peripheral device relative to the plate in a second plane perpendicular to the first plane.

10 Claims, 2 Drawing Sheets

COMPUTER WITH PERIPHERAL DEVICE MOUNTING ASSEMBLY

BACKGROUND

The disclosures herein relate to a computer system and, more particularly, to an assembly for mounting a peripheral device in the chassis of the computer system.

Several peripheral devices, such as disk drives, and the like, are available for a computer that are initially installed in the computer chassis by a manufacturer on a production-line basis, and yet must often be removed by the owner or service technician for service or replacement.

Normally, these peripheral devices may be serviced or replaced by removing the external case of the computer from its chassis to provide access to the device, and removing the device from the chassis. Since fasteners, such as screws, or the like are normally used to attach the peripheral device to the chassis, tools, such as screwdrivers, etc. are required. Therefore, the removal of the device from the chassis, and the attachment of the device to the chassis, is laborious, tedious, and time-consuming.

As space in the interior of the computer chassis tends to become more crowded, there is an increased emphasis to utilize relative small, low-profile, peripheral devices, such as portable disk, or floppy, drives, and the like, which compounds the removal problems discussed above. For example, these relative small devices require very small fasteners, such as screws, for mounting same which raises additional problems including difficulty in handling the smaller fasteners and drivers for same. Also, in the manufacturing process, the factory must be outfitted with additional air drivers to accommodate one low-volume production line. Additionally, the mounting points on these relatively small devices are usually located near the bottom plane of the device, making it difficult to access them with a screw and a driver.

Therefore, what is needed is an apparatus and method for mounting a peripheral device in the chassis of a computer which eliminates the above problems.

SUMMARY

Therefore, the present disclosure is directed to a computer and an assembly for mounting a peripheral device in the chassis of a computer. The assembly includes a carrier plate disposed in the chassis and having two or more extensions. The peripheral device is mounted on the plate between the extensions and is captured between the extensions to prevent relative movement between the device and the plate in a first plane. A hook member extends from the plate and engages the peripheral device to prevent movement of the peripheral device relative to the plate in a second plane perpendicular to the first plane.

Thus, a distinct technical advantage is achieved by the present disclosure since the peripheral device can easily and quickly be installed to the carrier plate without the need for fasteners, or the like.

DETAILED DESCRIPTION

Figure 1:
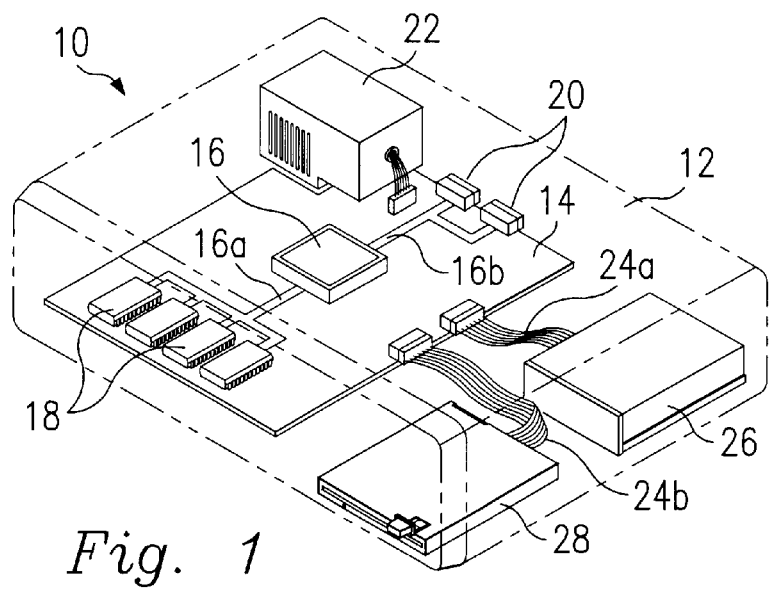
FIG. 1 is an isometric view of a computer incorporating features of the present disclosure.

An embodiment is illustrated in FIG. 1 in connection with a computer 10, which can be in the form of a server, a tower computer, a desktop computer, a laptop computer, or the like. The computer 10 includes a chassis 12 in which a motherboard 14 is mounted. A processor 16 is mounted in the chassis 12 in a conventional manner and a plurality of memory modules, 18 and two input/output (I/O) devices 20 are mounted on the motherboard 14.

Two buses 16a and 16b are also provided on the motherboard 14 and connect the processor 16 to the memory modules 18 and to the input/output devices 20, respectively. A power supply 22 is connected to the motherboard 14, and a pair of cable assemblies 24a and 24b connect the motherboard to a hard drive unit 26 and a portable disk drive unit 28, respectively. Other conventional components, such as electrical traces, electrical circuits and related devices (not shown) are also provided in the chassis 12.

Figure 2:
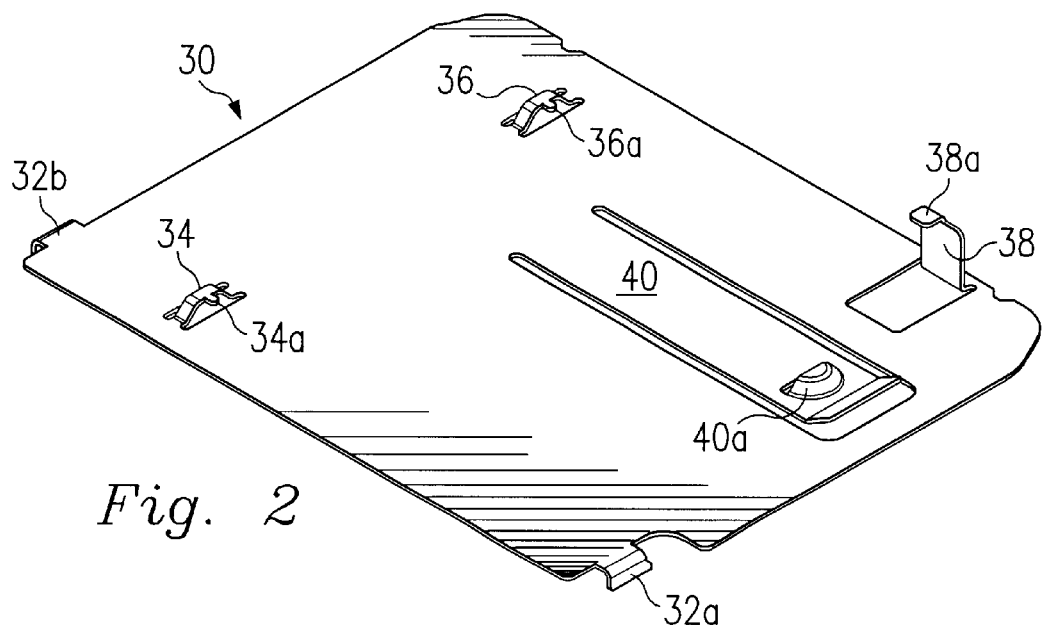
FIG. 2 is a front isometric view of a carrier plate utilized in the computer of FIG. 1.

A carrier plate 30 is depicted in FIG. 2 and is in the form of a rectangular plate having a pair of tabs 32a and 32b formed at each end thereof near the front edge as view in the drawing. The tabs 32a and 32b extend downwardly from the plane of the plate 30 to connect the plate to the chassis 12 such as by providing slots in the chassis for engagement by the tabs. This permits the plate 30 to be quickly attached to, and removed from, the chassis 12.

Two extensions 34 and 36 are formed by cutting and bending two portions of the structure of the plate 30 upwardly from the plane of the plate as viewed in FIG. 2. The extensions 34 and 36 are spaced a predetermined distance based on the standard distance between two mounting holes in a peripheral device, and have two horizontal tabs 34a and 36a respectively extending therefrom for insertion in the latter holes.

A tab 38 is located in a back corner of the plate 30 opposite the extensions 34 and 36, and extends upwardly from the plane of the plate. The tab 38 is provided with a bent portion 38a at its upper end so as to form a hook that extends over the top of the peripheral device. The tab 38 and its bent portion 38a are formed by cutting and bending a portion of the structure of the plate 30. A snap tab 40 is cut out of the plate by making a U-shaped cut, and an extension 40a is formed near the end of the tab 40 by cutting and bending a portion of the tab 40 upwardly from the plane of the plate as viewed in FIG. 2.

Figure 3:
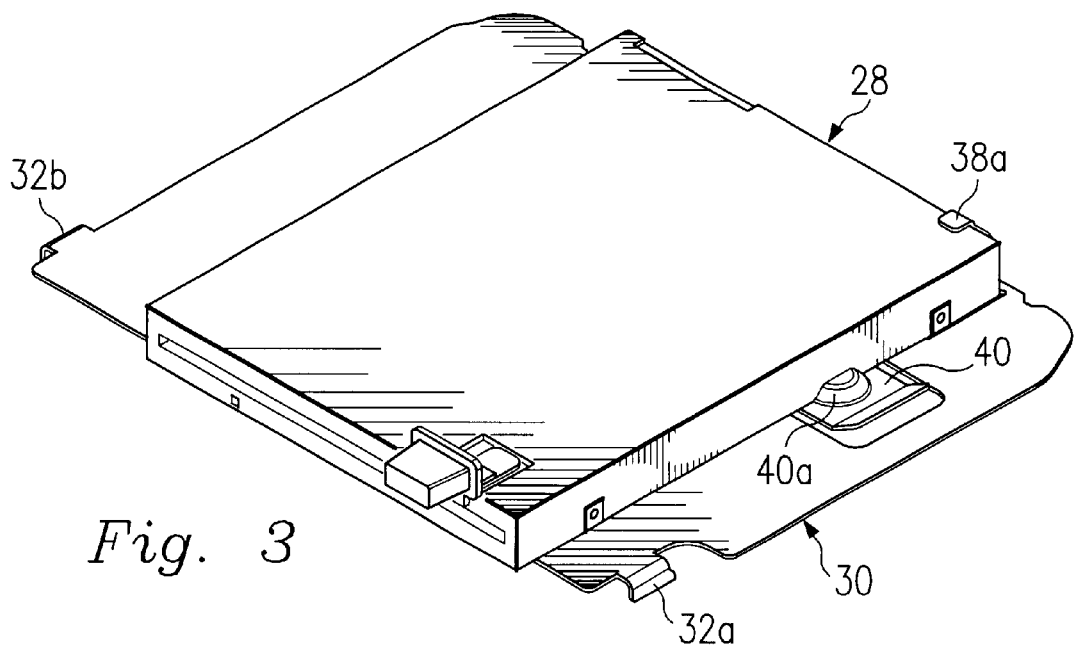
FIG. 3 is a isometric view depicting a disk drive assembled to the carrier plate of FIG. 2.
Figure 4:
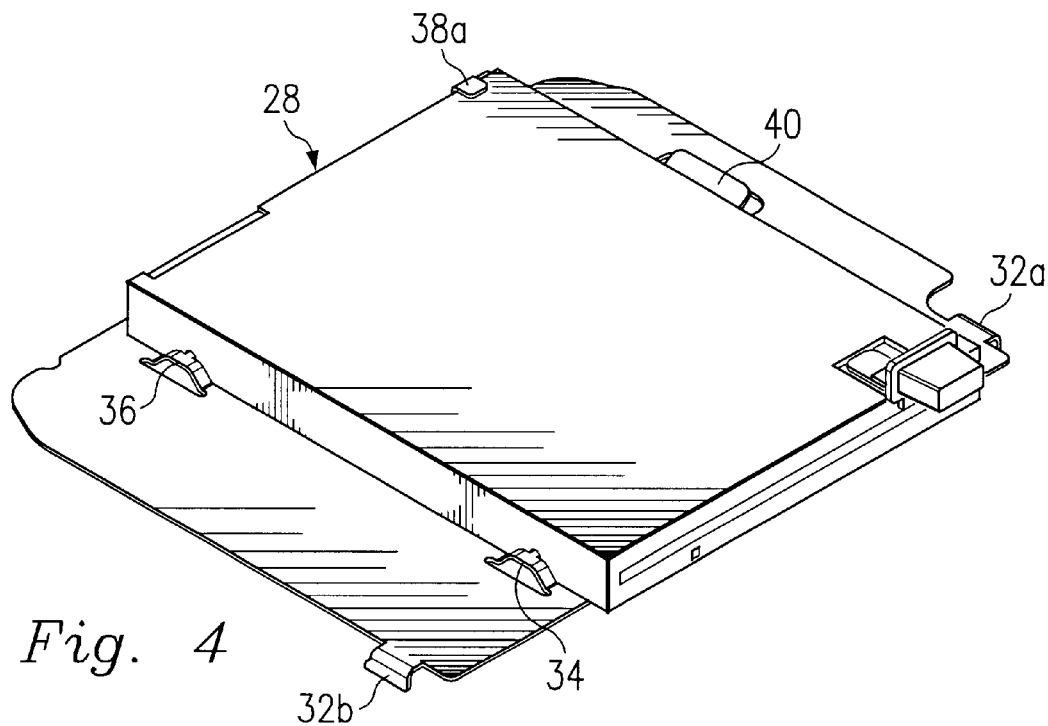
FIG. 4 is a rear isometric view of the assembly of FIG. 3.

The plate 30 is designed to receive a peripheral device, which for the purpose of example, is a portable floppy disk drive 44 which is shown mounted on the plate in FIGS. 3 and 4. To mount the drive 44 to the plate 30, the drive is placed on the right end portion of the plate as viewed in FIGS. 2 and 3 and under the bent portion 38a of the tab 38. This placement of the drive 44 on the plate 30 presses the extension 40a, and therefore the snap tab 40, downwardly, and the drive is then slid towards the extensions 34 and 36 until the tabs 34a and 36a extend in standard mounting holes provided in the corresponding side wall of the drive 44, as shown in FIG. 4. When the drive 44 reaches this position, the tab 40 snaps up to its normal position shown in FIG. 3, and the extension 40a engages the opposite wall of the drive.

As a result, the drive 28 is captured between the extensions 34 and 36 and the extension 40a which, along with the tabs 34a and 36a, prevent lateral and longitudinal movement of the drive 28 relative to the plate 30. The bent portion 38a of he tab 38 engages a portion of the upper surface of the drive 28 and therefore prevents movement of the drive in an upward direction.

The drive 28 is thus mounted on the plate 30 and is retained against any movement relative thereto. As stated above, the plate 30 can, in turn, be secured to the chassis 12 by engaging the tabs 32a and 32b with corresponding structure in the chassis, in a conventional manner.

According to the above embodiment, the drive 28 is mounted on the plate 30 quickly, and with a minimum of labor. Also, the plate 30 is simple in construction, easy to manufacture with a relative small amount of material, and relatively inexpensive. Further, the assembly consisting of the drive 28 mounted on the plate 30 has a relatively low profile with respect to height, thus making it easy to install in the chassis 12, even in areas where vertical space is at a minimum.

It is understood that several variations may be made in the foregoing without departing from the scope of the disclosures herein. For example, the specific number and location of the extensions and tabs of the carrier plate can be varied within the scope of the invention. It is also understood that the term "computer" is used in its broadest sense and is meant to include all types of computing systems including, but not limited to, laptop computers, central process units, towers, file servers, etc. Further, the references to "upper", "lower", "right" and "left" are done only for the convenience of presentation and are not intended to be limiting as to any specific location or orientation of a component of the embodiment described above.

Other modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A computer system comprising:
  a chassis;
  memory disposed in the chassis;
  storage formed in the chassis;
  a peripheral device disposed in the chassis;
  a carrier member disposed between the peripheral device and the chassis, the carrier member comprising:
    a plate having a first surface and a second surface opposite the first surface;
    at least two spaced apart extensions extending from the second surface of the plate for restricting horizontal movement of the peripheral device relative to the plate;
    a hook member extending above the second surface of the plate and engaging the peripheral device to restrict vertical movement of the peripheral device relative to the plate; and
    at least two tabs extending from the first surface of the plate for positioning the plate in the chassis.

2. The computer system of claim 1 wherein tabs are formed on at least a portion of the extensions, the tabs extending in openings formed in a wall of the peripheral device.

3. The computer system of claim 1 wherein the device has opposed walls, and wherein there are two extensions that engage one wall of the peripheral device and a third extension that engages the other wall of the peripheral device.

4. The computer system of claim 3 wherein tabs are formed on each of the two extensions and extend in openings formed in the one wall of the peripheral device.

5. The computer system of claim 3 further comprises a snap tab formed on a cantilevered arm in the plate, and wherein the third extension is formed on the snap tab so that initial placement of the peripheral device on the third extension presses the snap tab out of the plane of the plate and subsequent movement of the peripheral device relative to the plate allows the snap tab, and therefore the third extension, to snap back into a position in which the third extension engages the other wall.

6. A carrier for supporting a peripheral device in a chassis, the carrier comprising:
  a plate having a first surface and a second surface opposite the first surface;
  at least two spaced apart extensions extending from the second surface of the plate for restricting horizontal movement of the peripheral device relative to the plate;
  a hook member extending above the second surface of the plate and engaging the peripheral device to restrict vertical movement of the peripheral device relative to the plate; and
  at least two tabs extending from the first surface of the plate for positioning the plate in the chassis.

7. The carrier of claim 6 wherein tabs are formed on at least a portion of the extensions, the tabs extending in openings formed in a wall of the peripheral device.

8. The carrier of claim 6 wherein the peripheral device has opposed walls, and wherein there are two extensions that engage one wall of the peripheral device and a third extension that engages the other wall of the peripheral device.

9. The carrier of claim 8 wherein tabs are formed on each of the two extensions and extend in openings formed in the one wall of the peripheral device.

10. The carrier of claim 8 further comprises a snap tab formed on a cantilevered arm in the plate, and wherein the third extension is formed on the snap tab so that initial placement of the peripheral device on the third extension presses the snap tab out of the plane of the plate and subsequent movement of the peripheral device relative to the plate allows the snap tab and therefore the third extension, to snap back into a position in which the third extension engages the other wall.

* * * * *